(12) United States Patent
Mackrill et al.

(10) Patent No.: US 7,165,498 B2
(45) Date of Patent: Jan. 23, 2007

(54) VIBRATING TABLE ASSEMBLY FOR BAG FILLING APPARATUS

(75) Inventors: Don Mackrill, Richmond Hill (CA); Carmine Cacciacarro, Toronto (CA); Viren Panchal, Brampton (CA)

(73) Assignee: Control and Metering Limited, Mississauga (CA)

( * ) Notice: Subject to any disclaimer, the term of this patent is extended or adjusted under 35 U.S.C. 154(b) by 280 days.

(21) Appl. No.: 10/631,169

(22) Filed: Jul. 31, 2003

(65) Prior Publication Data

US 2005/0022700 A1  Feb. 3, 2005

(51) Int. Cl.
*A47B 85/00* (2006.01)
*A47B 9/00* (2006.01)

(52) U.S. Cl. .................. 108/20; 108/136; 108/147; 141/75; 248/638

(58) Field of Classification Search .................. 108/20, 108/21, 147, 136; 141/74–75, 83, 72, 78; 177/184, 201; 248/638, 678, 624; 297/DIG. 8, 297/344.12, 334.16
See application file for complete search history.

(56) References Cited

U.S. PATENT DOCUMENTS

| | | | | |
|---|---|---|---|---|
| 2,582,886 A | * | 1/1952 | Ruge ........................ 177/211 |
| 3,128,837 A | * | 4/1964 | Gibbons ..................... 177/76 |
| 3,805,905 A | * | 4/1974 | McClusky ................. 177/160 |
| 4,426,076 A | * | 1/1984 | Palmer ...................... 108/136 |
| 4,526,095 A | * | 7/1985 | Rewitzer .................... 100/39 |
| 4,718,464 A | | 1/1988 | Delves et al. |
| 4,804,550 A | * | 2/1989 | Bardsley et al. ............. 141/74 |
| 5,259,425 A | * | 11/1993 | Johnson et al. .............. 141/83 |
| 5,336,853 A | | 8/1994 | Davidson |
| 5,579,544 A | * | 12/1996 | Attler .................... 297/DIG. 8 |
| 5,630,646 A | * | 5/1997 | Trimble ................. 297/344.12 |
| 5,765,800 A | * | 6/1998 | Watanabe et al. ........... 248/638 |
| 5,787,945 A | * | 8/1998 | Riemersma ................. 141/114 |
| 5,975,155 A | | 11/1999 | Sienerth et al. |
| 6,227,408 B1 | | 5/2001 | Poulton |
| 6,241,059 B1 | * | 6/2001 | Fujita et al. ................ 248/638 |
| 6,419,203 B1 | * | 7/2002 | Dang ........................ 248/638 |
| 6,648,295 B1 | * | 11/2003 | Herren et al. .............. 248/638 |
| 6,755,384 B1 | * | 6/2004 | Gorfain ..................... 248/678 |
| 6,854,401 B1 | * | 2/2005 | Lin ........................... 108/147 |

FOREIGN PATENT DOCUMENTS

| | | | | |
|---|---|---|---|---|
| GB | 2 154 975 A | | 9/1985 | |
| JP | 01139301 | * | 5/1989 | ................. 141/74 |

OTHER PUBLICATIONS

Flomat Ltd. Drawings of Lift Table, 1984.

* cited by examiner

*Primary Examiner*—Janet M. Wilkens
*Assistant Examiner*—Hanh V. Tran
(74) *Attorney, Agent, or Firm*—Kirkpatrick & Lockhart Nicholson Graham LLP

(57) ABSTRACT

A vibrating table assembly for an apparatus for filling and weighing bulk bags comprises a bag support table, a vibrating device for vibrating the bag support table, and a lifting device for raising an lowering the bag support table, the lifting device being located below the bag support table. Preferably, the lifting device comprises a convoluted air bellows. Location of the lifting device below the table overcomes problems encountered with known bag filling apparatus where the bag support table and the lifting mechanism are connected to the frame of the apparatus.

28 Claims, 4 Drawing Sheets

VIBRATING TABLE ASSEMBLY FOR BAG FILLING APPARATUS

FIELD OF THE INVENTION

The invention relates to apparatus for filling and weighing bulk bags, and particularly relates to vibrating table assemblies for use in such apparatus.

BACKGROUND OF THE INVENTION

Efficient filling and weighing of bulk bags (also known as flexible intermediate bulk containers) is performed with an apparatus on which a bulk bag is suspended by loops above a bag support table. During filling of the bag, the bag bottom is partly supported by the support table, which typically has a top portion shaped like a flattened, truncated pyramid. A pair of unbalanced counter-rotating motors are located inside the support table to vibrate and compact the contents of the bag as it is being filled.

The bag support table is brought into contact with the bulk bag either by lowering the bag or raising the support table. Two types of apparatus in which the support table can be raised and lowered are disclosed in U.S. Pat. Nos. 4,718,464 and 5,336,853. In U.S. Pat. No. 4,718,464, the support table is raised and lowered by a piston and cylinder device attached to the frame of the bag filling apparatus. In U.S. Pat. No. 5,336,853, the support table is raised and lowered by a screw and collar system incorporated into the frame.

To ensure that a bulk bag is filled with the correct amount of material, it may be weighed several times during the filling cycle. In order to accurately weigh the bulk bag, it must be separated from the bag support table. Each time the bulk bag is weighed, the motors in the support table are allowed to wind down, and the bag support table is lowered. As the motors wind down, they lose their synchronization and generate significant vibrational forces on the bag support table. With the support table attached to the frame of the apparatus, these vibrations are effectively absorbed.

However, attachment of the bag support table and the lifting mechanism to the frame prevents the bag support table from being used for retrofit applications, for example to be incorporated into an older style bag filling apparatus not having a bag support table. Therefore, there is a need for a self-contained bag support table which does not rely on the frame of the bag filling apparatus for support or for vibration damping.

SUMMARY OF THE INVENTION

The present invention overcomes the above limitations of the prior art by providing a vibrating table assembly for a bag filling apparatus. The vibrating table assembly according to the invention is a self-contained unit comprising a bag support table of similar or identical shape to the tables shown in the prior art, vibrating means for vibrating the bag support table, a lifting device for raising and lowering the bag support table, with the lifting device being located below the bag support table, and at least one resilient connector through which the lifting device is connected to the bag support table.

DETAILED DESCRIPTION OF PREFERRED EMBODIMENTS

Figure 1:
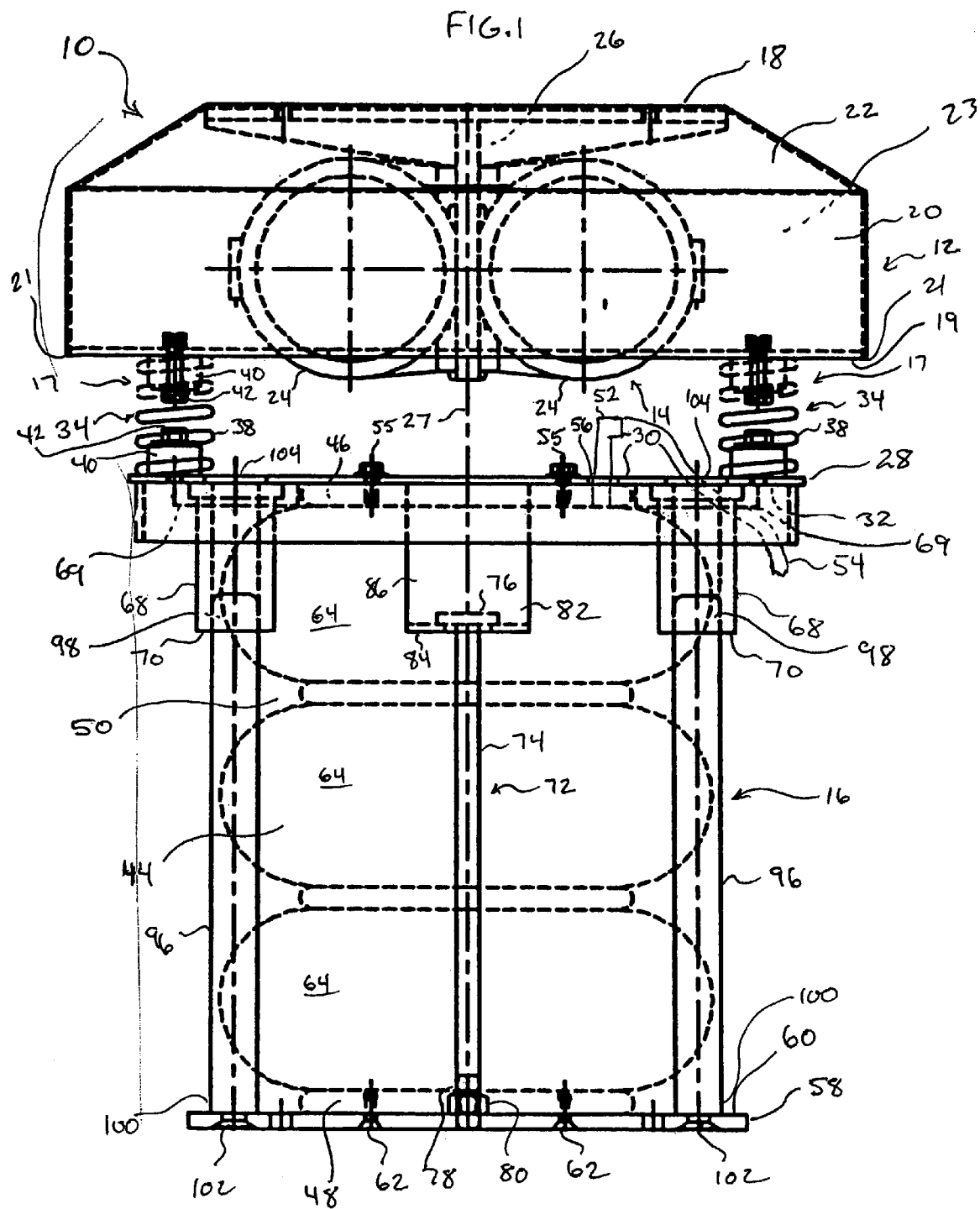
FIG. 1 is a side elevational view of a preferred table assembly according to the present invention, with the bag support table at its upper height limit.
Figure 2:
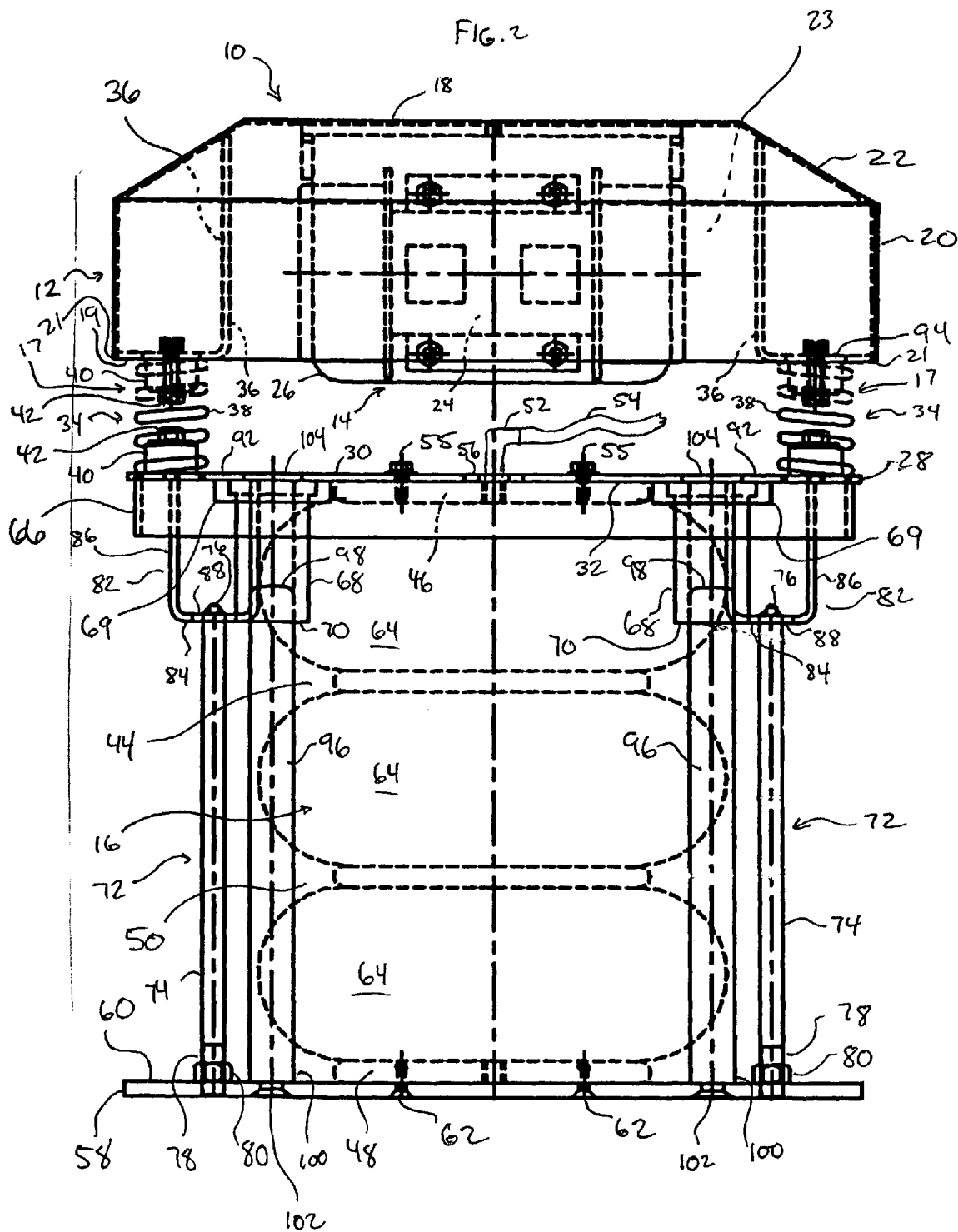
FIG. 2 is a front elevational view of the table assembly of FIG. 1, with the bag support table at its upper height limit.
Figure 3:
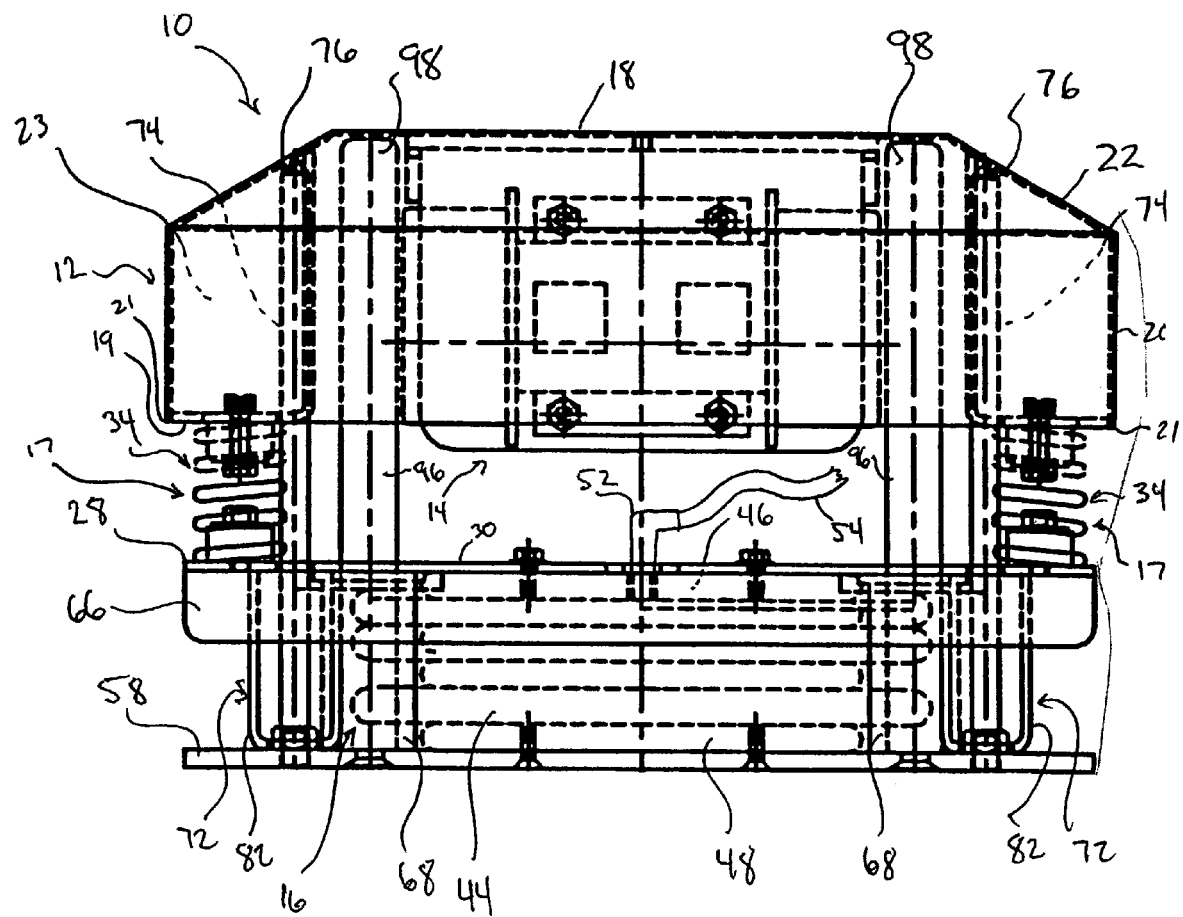
FIG. 3 is a front elevational view of the table assembly of FIG. 1, with the bag support table at its lower height limit.

FIGS. 1 to 3 illustrate a preferred table assembly 10 according to the present invention.

Table assembly 10 comprises a bag support table 12, a vibrating device 14 for vibrating the bag support table 12, a lifting device 16 for raising and lowering the bag support table 12 and at least one resilient connector 17 through which the bag support table 12 and the lifting device 16 are connected. As shown in the drawings, the lifting device 16 is located below the bag support table 12.

The bag support table 12 and vibrating device 14 are similar to those described in prior U.S. Pat. Nos. 4,718,464 and 5,336,853, mentioned above. Specifically, the bag support table 12 is rectangular, preferably square, in plan view, having a rectangular upper surface 18, four vertical side surfaces 20, and four sloped side surfaces 22 connecting the vertical side surfaces 20 and the upper surface 18. The side surfaces 20, 22 extend outwardly and downwardly from the upper surface 18 to a lower edge 19 of the table 12. The table 12 has four corners 21 at which the side surfaces 20 converge with one another and with the lower edge 19. It will be appreciated that the table need not have the rectangular shape shown in the drawings, but may be of any other suitable shape, including circular in plan view.

The vibrating device 14 comprises one or more vibrating motors, and preferably comprises two unbalanced counter-rotating motors 24 which are at least partially enclosed in a hollow space 23 defined by the upper surface 18 and the side surfaces 20, 22, and are preferably mounted inside the bag support table 12 by a mounting bracket 26.

As shown in the drawings, the lifting device 16 is located centrally below the bag support table 12, such that a central vertical axis 27 of the table assembly 10 extends through the centre of the bag support table 12 and the centre of the lifting device 16. Locating the lifting device 16 centrally below the bag support table 12 assists in absorbing side loads caused by vibrations generated during winding down of the motors 24.

The connection between the lifting device 16 and the bag support table 12 is preferably made through a rectangular, preferably square, mounting plate 28 having an upper surface 30 and a lower surface 32. As shown, the bag support table 12 is mounted on the upper surface 30 of mounting plate 28, with the lifting device 16 being attached to the lower surface 32.

In order to absorb vibration caused by motors 24, the bag support table 12 is preferably connected to the mounting plate 28 in a manner which will dampen vibration of the motors 24. In the preferred embodiment shown in the drawings, the bag support table 12 and mounting plate 28 are connected through one or more resilient connectors 17 which, in the preferred embodiment shown in the drawings, comprise a plurality of spring supports 34. As shown in the drawings, four such spring supports 34 are preferably provided, each of which is secured at its lower end to a respective corner of the mounting plate 28. The upper ends of the spring supports 34 are secured to an elongate, L-shaped bracket 36 (FIG. 2) which forms part of the bag support table and which is secured by welding or other suitable means to the inside of the bag support table 12. Each spring support 34 comprises a coil spring 38 secured at its upper and lower ends by spring retainers 40 and bolts 42 which may preferably be threaded into tapped openings (not shown) in the mounting plate 28 and L-shaped bracket 36.

Although the preferred resilient connectors described and shown in this application are spring supports comprising axially-extending coil springs positioned at the corners of the support table, it will be appreciated that resilient connectors other than spring supports can be used. For example, the resilient connectors may comprise elastomeric supports which are comprised of a resilient polymeric material such as rubber, the elastomeric supports being mounted between the lifting device and the bag support table. It will also be appreciated that the table assembly according to the invention could include more or fewer resilient connectors than shown in the drawings, depending on the shape of the table and the degree of vibration damping required. For example, a resilient connector may be centrally located between the lifting device and the support table.

As shown in the drawings, the lifting device 16 preferably comprises a convoluted air bellows 44 having a top plate 46 and bottom plate 48 made of metal, and an expandable central portion 50 between the top plate 46 and bottom plate 48. Preferably, the central portion 50 is made of an elastomeric material such as rubber, and can be inflated by a pressurized gas such as air. The top plate is preferably provided with a gas inlet/outlet 52 which is preferably connected by a flexible hose 54 to a source of pressurized gas (not shown).

The top plate 46 is secured to the lower surface 32 of mounting plate 28, preferably by bolts 55, with the gas inlet/outlet 52 of the air bellows 44 extending through an aperture 56 in the mounting plate 28.

The table assembly 10 further comprises a rectangular base plate 58 having an upper surface 60 on which the bottom plate 48 of air bellows 44 is mounted, preferably by bolts 62 which are countersunk into the base plate 58.

The inventors have found that the use of a convoluted air bellows is particularly preferred over other types of lifting devices, as it permits the table assembly 10 to be very compact. For example, with the air bellows 44 in its fully collapsed condition, shown in FIG. 3, the entire table assembly 10 preferably has a height of about 17 inches, which is comparable to that of prior art table assemblies in which the raising and lowering means are contained in the frame of the bag filling apparatus. Such a low profile may not be possible with other conventional lifting devices. Furthermore, the entire table assembly can fit within the footprint of the filling and weighing apparatus.

The convoluted air bellows is also preferred since it is effective to absorb side loads which result when the bag support table 12 is lowered during winding down of the motors 24. Such side loading could cause other types of lifting devices to bind.

In the preferred embodiment shown in the drawings, the air bellows is a triple convoluted air bellows, comprising three inflatable sections 64.

In order to prevent deformation of the mounting plate 28 when the bag support table 12 is raised against the bottom of a bulk bag, the lower surface 32 of mounting plate 28 is preferably provided with a peripheral, downwardly extending skirt 66.

The table assembly 10 is also provided with stop members for preventing downward movement of the bag support table 12 beyond a lower height limit (FIG. 3), and for preventing upward movement of the bag support table 12 beyond an upper height limit (FIGS. 1 and 2).

The assembly 10 includes a plurality of lower stop members which are preferably mounted on the base plate 58 or the mounting plate 28, and which limit downward movement of the mounting plate 28 relative to the base plate 58. In the preferred embodiment shown in the drawings, there are four lower stop members, each in the form of a hollow sleeve 68 extending downwardly from the lower surface 32 of the mounting plate 28. Each sleeve 68 has an outwardly extending base flange 69 by which it is secured to the mounting plate 28 by welding or the like, as well as a lower surface 70. The length of each sleeve 68 is substantially the same as the height of the air bellows 44 in its collapsed condition, as shown FIG. 3. With air bellows 44 in this condition, the lower surface 70 of each sleeve 68 abuts the upper surface 60 of mounting plate 58. With the air bellows 44 collapsed as shown in FIG. 3, the bag support table 12 is at its lower height limit, preferably having a height, measured from the base plate 58 to the upper surface 18 of support table 12, of about 17 inches.

As best seen in FIGS. 2 and 3, table assembly 10 is provided with a pair of upper stop members 72. Each upper stop member 72 comprises an elongate member 74 which may preferably comprise a bolt. The elongate member 74 has an enlarged upper end 76 which may preferably comprise a bolt head or other suitable enlargement. The lower end 78 of elongate member 74 is attached to the upper surface 60 of base plate 58. In the preferred embodiment, the bolt comprising elongate member 74 is provided with threads at its lower end 78. The threads engage the threads of a nut 80 which is secured to the upper surface 60 of base plate 58.

Attached to the lower surface 32 of mounting plate 28 are a pair of brackets 82, each of which comprises a U-shaped channel having a lower portion 84 which is substantially horizontal, and a pair of substantially vertical sides 86 which are connected to the mounting plate 28. The lower portion 84 of bracket 82 has an aperture 88 through which the elongate member 74 extends. The aperture 88 is sized to closely receive the portion of elongate member 74 which is intermediate the ends 76, 78, and has an area which is less than the area of enlarged upper end 76 of elongate member 74, such that when the bag support table 12 is at its upper height limit (shown in FIGS. 1 and 2) the enlarged upper end 76 of elongate member 74 abuts the lower portion 84 of bracket 82 and is located between the lower portion 84 of bracket 82 and the lower surface 32 of the mounting plate 28.

As seen in FIG. 3, the brackets 82 preferably also function as lower stop members, with the lower portion 84 abutting the upper surface 60 of base plate 58 when the air bellows 44 is in its collapsed condition. In order to accomplish this, the aperture 88 in the lower portion 84 of bracket 82 preferably has a diameter sufficient to accommodate nut 80.

In the preferred embodiment shown in the drawings, a pair of upper stop members 72 are provided. Each of the upper stop member 72 is located adjacent a short edge of base plate 58 (FIG. 2) and preferably spaced centrally between the longer sides of base plate 58 (FIG. 1).

It will be appreciated that the table assembly 10 can be provided with more or fewer upper stop members 72 than shown in the drawings. However, at least two such stop members 72 are preferred in order to prevent binding of the elongate member 74 due to side loading which occurs during winding down of motors 24.

As the air bellows 44 collapses under the weight of the bag support table 12, the mounting plate 28 and bag support table 12 move downwardly relative to the upper end 76 of elongate member 74. Therefore, the mounting plate 28 is provided with apertures 92 (FIG. 2) which are located directly above each upper stop member 72 to permit the elongate member 74 to pass through the mounting plate 28 as shown in FIG. 3. Similarly, the L-shaped brackets 36 are provided with apertures 94 (FIG. 2) through which the upper stop member 72 can pass. Preferably, with the bag support table 12 at its lower height limit as shown in FIG. 3, the upper end 76 of elongate member 74 is received between L-shaped bracket 36 and the side surfaces 20, 22 of bag support table.

Although the upper stop members 72 assist in guiding the vertical movement of the support table 12, the assembly 10 is preferably provided with one or more additional guide members to keep the vertical axis 27 aligned with the vertical during raising and lowering the support table 12. In the preferred embodiment shown in the drawings, the vertical guide members comprise four vertically extending rods 96, each having an upper end 98 and a lower end 100, with the lower end 100 being secured to the base plate 58 by countersunk screws 102. With the bag support table 12 at its upper height limit, the upper end 98 of each rod 96 is received in one of the sleeves 68 comprising the lower stop member. As the support table 12 is lowered, the upper end 98 of each rod 96 passes through an aperture 104 in the mounting plate 28. When the support table 12 is at its lower height limit, as shown in FIG. 3, the upper end of each rod 96 is received just below the upper surface 18 of the support table 12, between the vibrating motors 24 and one of the L-shaped brackets 36.

Figure 4:
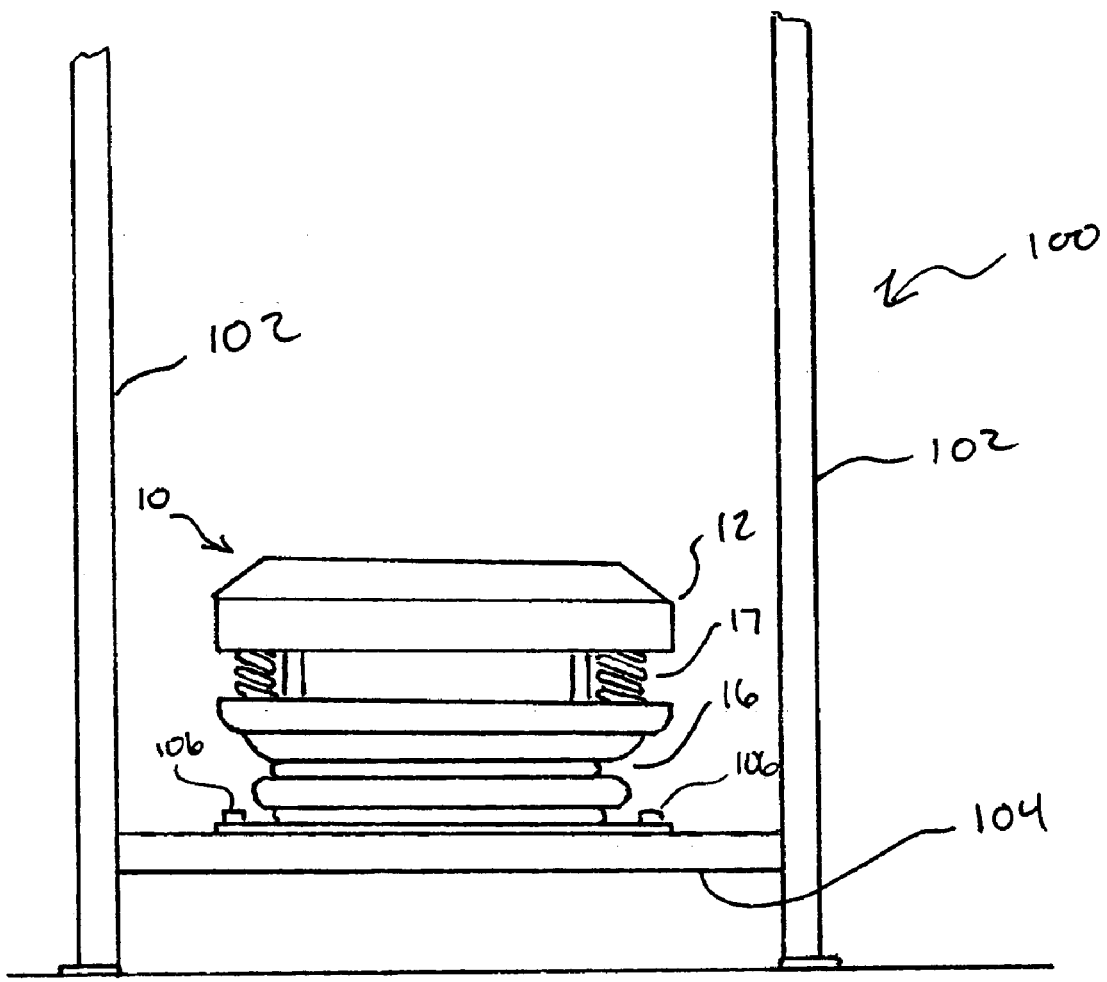
FIG. 4 is a side elevation showing the table assembly of FIG. 1 mounted to the frame of a bag filling apparatus.

The table assembly 10 is preferably either mounted to the floor below the bag filling apparatus or to the frame of the filling apparatus. For floor mounting, the base plate 58 is secured to the floor by fasteners such as bolts or the like, preferably at or near its four corners. One possible arrangement for mounting a bag filling apparatus 100 is illustrated in FIG. 4, which shows only two vertical frame members 102 and a horizontal cross member 104 of the apparatus 100. It will be appreciated that the apparatus 100 partially illustrated in FIG. 4 preferably has four vertical members 102 forming a rectangular frame, with two cross members 104 extending between the vertical members 102 in spaced, parallel relation, as in U.S. Pat. Nos. 4,718,464 and 5,336,853. In the embodiment shown in FIG. 4, the table assembly is mounted to the horizontal frame members, with the base plate 58 being secured at or near its corners to the horizontal frame members 104. The base plate 58 is preferably secured by fasteners such as bolts 106 or the like, with only the heads of bolts 106 being visible in FIG. 4. As the frame structure shown in FIG. 4 is common to many existing bag filling apparatus, the mounting arrangement shown in FIG. 4 permits the table assembly 10 to be incorporated into an existing apparatus with minimal modification.

Although the invention has been described in connection with certain preferred embodiments, it is not intended to be limited thereto. Rather, the invention is intended to include all embodiments which may fall within the scope of the following claims.

What is claimed is:

1. A table assembly for a bag filling apparatus, comprising:
    (a) a bag support table having an upper surface for at least partially supporting a bag to be filled;
    (b) at least one vibrating motor for vibrating the bag support table, the at least one vibrating motor being connected to the bag support table and being located below the upper surface of the table;
    (c) a lifting device for raising and lowering the bag support table along an axis, the lifting device being located below said bag support table;
    (d) at least one resilient connector through which the lifting device is connected to the bag support table, the at least one resilient connector damping vibrations produced by the at least one vibrating motor and transmitted from the bag support table to the lifting device;
    (e) a base plate having an upper surface on which the lifting device is mounted;
    (f) a mounting plate on which the bag support table is mounted, the mounting plate having an upper surface and a lower surface; and
    (g) a guide member for guiding vertical movement of the bag support table; wherein said guide member comprises an elongate member protruding vertically from the base and has an upper end which passes through an aperture in the mounting plate during lowering of the support table.

2. The table assembly according to claim 1, wherein the lifting device is centrally located below the bag support table.

3. The table assembly according to claim 1, the bag support table being mounted on the upper surface of the mounting plate through the at least one resilient connector and the lifting device being attached to the lower surface of the mounting plate.

4. The table assembly according to claim 1, wherein the at least one resilient connector is selected from the group consisting of spring supports and elastomeric supports.

5. The table assembly according to claim 4, wherein the at least one resilient connector comprises a plurality of spring supports.

6. The table assembly according to claim 5, wherein each of the spring supports comprises an axially extending spring having an upper end connected to the bag support table.

7. The table assembly according to claim 5, wherein each of the spring supports has a lower end connected to the upper surface of the mounting plate, and wherein the lifting device is attached to the lower surface of the mounting plate.

8. The table assembly according to claim 4, wherein the mounting plate is rectangular and the at least one resilient connector comprises a plurality of spring supports, with one said spring support positioned at each corner of the mounting plate.

9. The table assembly according to claim 8, wherein the upper surface of the bag support table is rectangular in a plane perpendicular to said axis and has four outwardly and downwardly sloping side walls extending from the upper surface to a lower edge,
    wherein the bag support table has four corners at which the side walls converge with one another and with the lower edge, and
    wherein each of the spring supports extends between one of the corners of the mounting plate and one of the corners of the bag support table.

10. The table assembly according to claim 9, comprising two of said vibrating motors which are at least partially enclosed in a hollow space defined by the upper surface and the sloping side walls of the bag support table.

11. The table assembly according to claim 1, wherein the lifting device comprises a convoluted air bellows.

12. The table assembly according to claim 11, wherein the convoluted air bellows has a top plate, a bottom plate and an expandable central portion between the top and bottom plates, the top plate being secured to the lower surface of the mounting plate.

13. The table assembly according to claim 12, wherein the bellows has a central axis which is coincident with a central axis of the table mounting plate.

14. The table assembly according to claim 13, wherein the bellows is a triple convoluted air bellows.

15. The table assembly according to claim 1, further comprising a lower stop member for preventing downward movement of the bag support table beyond a lower height limit.

16. The table assembly according to claim 15, said lower stop member being located above the base plate and having a height which is substantially the same as that of the lifting device in a collapsed state.

17. The table assembly according to claim 16, wherein the lower stop member abuts both the base plate and the mounting plate when the bag support table is at the lower height limit.

18. The table assembly according to claim 1, further comprising at least one upper stop member for preventing upward movement of the bag support table beyond an upper height limit.

19. The table assembly of claim 18, wherein the bag support table is mounted on the upper surface of the mounting plate; wherein the table assembly further comprises at least one bracket attached to the lower surface of the mounting plate, said bracket having a lower portion spaced from the lower surface of the mounting plate, the lower portion having an aperture sized to closely receive the upper stop member; and wherein said upper stop member comprises an elongate member having a lower end attached to the upper surface of the base plate, the elongate member extending through the aperture in the bracket and having an enlarged upper end having an area greater than an area of the aperture, such that when the bag support table is at the upper height limit the enlarged upper end abuts the lower portion of the bracket and is located between the lower portion of the bracket and the lower surface of the mounting plate.

20. The table assembly of claim 19, comprising two of said upper stop members attached to opposite sides of said base plate.

21. The table assembly of claim 1, further comprising a support sleeve attached to the mounting plate, wherein said guide member is slidably received in said support sleeve.

22. The table assembly according to claim 17,
wherein said lower step member comprises a support sleeve attached to the mounting plate, wherein said guide member is slidably received in said support sleeve.

23. The table assembly according to claim 22, wherein said support sleeve extends downwardly from the lower surface of the mounting plate.

24. A table assembly for a bag filling apparatus, comprising:
(a) a bag support table having an upper surface for at least partially supporting a bag to be filled;
(b) at least one vibrating motor for vibrating the bag support table, the at least one vibrating motor being connected to the bag support table and being located below the upper surface of the table;
(c) a lifting device for raising and lowering the bag support table along an axis, the lifting device being located below said bag support table;
(d) at least one resilient connector through which the lifting device is connected to the bag support table, the at least one resilient connector damping vibrations produced by the at least one vibrating motor and transmitted from the bag support table to the lifting device;
(e) at least one upper stop member for preventing upward movement of the bag support table beyond an upper height limit;
(f) a mounting plate having an upper surface and a lower surface, the bag support table being mounted on the upper surface of the mounting plate; and
(g) at least one bracket attached to the lower surface of the mounting plate, said bracket having a lower portion spaced from the lower surface of the mounting plate, the lower portion having an aperture sized to closely receive the upper stop member;
wherein said upper stop member comprises an elongate member having a lower end attached to the upper surface of the base plate, the elongate member extending through the aperture in the bracket and having an enlarged upper end having an area greater than an area of the aperture, such that when the bag support table is at the upper height limit the enlarged upper end abuts the lower portion of the bracket and is located between the lower portion of the bracket and the lower surface of the mounting plate.

25. The table assembly of claim 24, comprising two of said upper stop members attached to opposite sides of said base plate.

26. The table assembly of claim 1, comprising at least two of said guide members.

27. The table assembly of claim 1, wherein the base plate and the mounting plate are both rectangular and both have four corners, and wherein the table assembly includes four of said guide members, each of which extends from a corner of the base plate to a corner of the mounting plate.

28. The table assembly of claim 1, wherein said guide member comprises a vertically-extending rod.

* * * * *